(12) United States Patent
Wei

(10) Patent No.: US 8,322,868 B2
(45) Date of Patent: *Dec. 4, 2012

(54) DURABLE FLUORESCENT ARTICLES HAVING MULTIPLE FILM LAYERS

(75) Inventor: Guang-Xue Wei, Buffalo Grove, IL (US)

(73) Assignee: Avery Dennison Corporation, Pasadena, CA (US)

( * ) Notice: Subject to any disclaimer, the term of this patent is extended or adjusted under 35 U.S.C. 154(b) by 388 days.

This patent is subject to a terminal disclaimer.

(21) Appl. No.: 12/464,128

(22) Filed: May 12, 2009

(65) Prior Publication Data

US 2010/0290119 A1    Nov. 18, 2010

(51) Int. Cl.
G02B 5/124 (2006.01)
B32B 7/02 (2006.01)

(52) U.S. Cl. ........ 359/530; 428/212; 428/412; 428/522; 359/350; 359/515; 359/529; 359/534; 252/301.35

(58) Field of Classification Search .................. 359/529, 359/530, 350, 515, 534; 428/338, 520, 212, 428/412, 522; 252/301.35
See application file for complete search history.

(56) References Cited

U.S. PATENT DOCUMENTS

| | | |
|---|---|---|
| 2,407,680 A | 9/1946 | Palmquist |
| 3,810,804 A | 5/1974 | Rowland |
| 4,486,363 A | 12/1984 | Pricone et al. |
| 4,588,258 A | 5/1986 | Hoopman |
| 4,601,861 A | 7/1986 | Pricone et al. |
| 4,775,219 A | 10/1988 | Appeldorn et al. |
| 5,213,872 A | 5/1993 | Pricone et al. |
| 5,310,436 A | 5/1994 | Pricone et al. |
| 5,672,643 A * | 9/1997 | Burns et al. ............ 524/90 |
| 5,754,337 A * | 5/1998 | Burns et al. ............ 359/515 |
| 5,920,429 A * | 7/1999 | Burns et al. ............ 359/515 |
| 6,375,776 B1 * | 4/2002 | Buoni et al. ............ 156/209 |
| 6,531,205 B1 * | 3/2003 | Buoni et al. ............ 428/156 |
| 6,652,954 B2 * | 11/2003 | Nielsen et al. ............ 428/143 |
| 6,962,670 B1 * | 11/2005 | Hanson et al. ............ 264/21 |
| 7,264,880 B2 * | 9/2007 | Wei et al. ............ 428/412 |
| 8,000,005 B2 * | 8/2011 | Kindler et al. ............ 359/443 |
| 2003/0203211 A1 * | 10/2003 | Wei et al. ............ 428/412 |
| 2003/0203212 A1 * | 10/2003 | Wei et al. ............ 428/412 |
| 2006/0099449 A1 * | 5/2006 | Amano et al. ............ 428/690 |
| 2007/0184278 A1 * | 8/2007 | Wei et al. ............ 428/411.1 |
| 2008/0182110 A1 | 7/2008 | Wei |

* cited by examiner

*Primary Examiner* — Frank Font

(74) *Attorney, Agent, or Firm* — Avery Dennison Corporation

(57) ABSTRACT

A fluorescent article includes an underlayer colored fluorescent film and an overlayer colored fluorescent film, which is provided over the underlayer colored fluorescent film. The underlayer colored fluorescent film includes a first fluorescent colorant in an underlayer acrylic matrix. The overlayer colored fluorescent film includes a second fluorescent in an overlayer acrylic matrix.

17 Claims, 3 Drawing Sheets

DURABLE FLUORESCENT ARTICLES HAVING MULTIPLE FILM LAYERS

TECHNICAL FIELD

The present invention relates to fluorescent articles, and more particularly, to a durable fluorescent yellow retroreflective article including multiple fluorescent layers.

BACKGROUND

Articles incorporating fluorescent colorants into polymeric matrices can be used for various applications including signage, vehicle markings, roadway markings, and other applications where high visibility is desired, such as information dissemination, visibility, visual signaling, and quick detection. The extraordinarily bright appearance of fluorescent materials is what provides this enhanced visibility, which is especially pronounced at dawn and dusk.

Fluorescent colorants that can be potentially used in outdoor signage can have poor UV-light stability and can fade upon exposure to certain wavelengths of visible light. This can potentially degrade the long-term outdoor durability of the signage. A UV-light screening layer can be provided on a base fluorescent polymer matrix layer to mitigate exposure to UV-light and enhance outdoor durability. The UV-light screening layer can be made by dissolving UV-light absorbing compounds into a transparent polymer matrix. The screen layer contains UV absorbing compounds that absorb a defined range of UV-light (e.g., wavelength of about 290 nm to about 400 nm). The screen layer, however, does not substantially block visible light that can cause substantial fading of fluorescent colorants in the polymer matrix.

Acrylic polymers have advantages of polymers such as polycarbonate. Typical in this regard is polymethylmethacrylate (PMMA). Compared to other polymers such as polycarbonate, such acrylics are inexpensive, easier to process and are less susceptible to UV light degradation. For example, after a few years of outdoor exposure, polycarbonate can develop a hazy and/or yellow appearance. Acrylics, however can withstand such outdoor weathering for a significantly longer time before the development of such defects.

Although fluorescent acrylic articles appear to hold some promise, issues concerning color stabilization and/or fluorescent stabilization against ultraviolet radiation present a problem of substantial proportions. Ideally, if a solution could be found without the need for placement of a separate UV light screening and/or absorbent layer over the article, such a solution is potentially all the more valuable. Addressing these problems is needed for articles to be used under outdoor conditions which subject the article to lengthy exposure to sunlight.

It has been suggested that there are three approaches for obtaining a desired fluorescent color in the typical instance when a given loading of available fluorescent dyes does not achieve the target fluorescent coloration. One approach is to adjust the loading quantity of the colorant.

A second approach is to blend multiple fluorescent dyes together. Such an approach raises compatibility issues, both between the dyes themselves and between one or both of the dyes and the polymer matrix within which they would be loaded. Light durability also is an issue. Different dyes have different compatibility with different polymers due to differences between or among chemical structures. Durability of a given fluorescent colorant is different in different polymer matrices. One dye may have unfavorable interactions with another dye within a polymer matrix. Also even the same dye can have different light durability in different polymer matrices.

The third approach is for the polymer matrix to contain a blend of non-fluorescent dye with a fluorescent dye. The issues noted above for multiple fluorescent dyes in the same polymer matrix are raised for this option as well. The issues could be even more difficult due to the typical greater chemical difference between a fluorescent dye and a non-fluorescent dye. Additionally, there is a chance that the non-fluorescent dye may interfere with the fluorescent properties of the fluorescent dye, which may dramatically reduce brightness of the sheeting. A non-fluorescent dye can quench the overall fluorescing of the fluorescent dye.

As such, there is a need for a solution for this coloration problem.

SUMMARY

The present invention relates to a fluorescent article that includes an underlayer colored fluorescent film and an overlayer colored fluorescent film that is provided over the underlayer colored film. The underlayer colored fluorescent film includes a first fluorescent colorant in an underlayer acrylic matrix. The overlayer colored fluorescent film includes a second fluorescent colorant in an overlayer acrylic matrix. The second fluorescent colorant in the overlayer film at least partially blocks light in a first wavelength range while allowing transmission of an amount of light in a second wavelength range effective to make the first fluorescent colorant fluoresce.

In one aspect of the invention, the first fluorescent colorant has a first chemistry and the second fluorescent colorant has a second chemistry different from the first chemistry.

In a further aspect of the invention, the fluorescent article further comprises retroreflective elements. The retroreflective elements can be formed into the surface of the underlayer colored fluorescent film opposite the overlayer fluorescent film.

In yet another aspect of the invention, the fluorescent article comprises a cap layer that overlies the overlayer colored fluorescent film.

A further aspect of the invention relates to a fluorescent yellow retroreflective article that includes an underlayer fluorescent yellow-green film and an overlayer fluorescent orange film provided over the underlayer fluorescent yellow-green film. The underlayer fluorescent yellow-green film includes a first fluorescent colorant within an underlayer acrylic matrix. The overlayer fluorescent orange film includes a second fluorescent colorant within an overlayer acrylic matrix.

The fluorescent yellow-green coloration of the underlayer fluorescent yellow-green film can be provided by a fluorescent dye that includes at least one yellow-green shade dye chosen from benzothiazine, thioxanthene and benzoxanthene. The fluorescent orange coloration of the overlayer fluorescent orange film can be provided by a fluorescent dye that includes at least one of orange shade fluorescent dye and/or red shade perylene dye.

DETAILED DESCRIPTION

Figure 1:
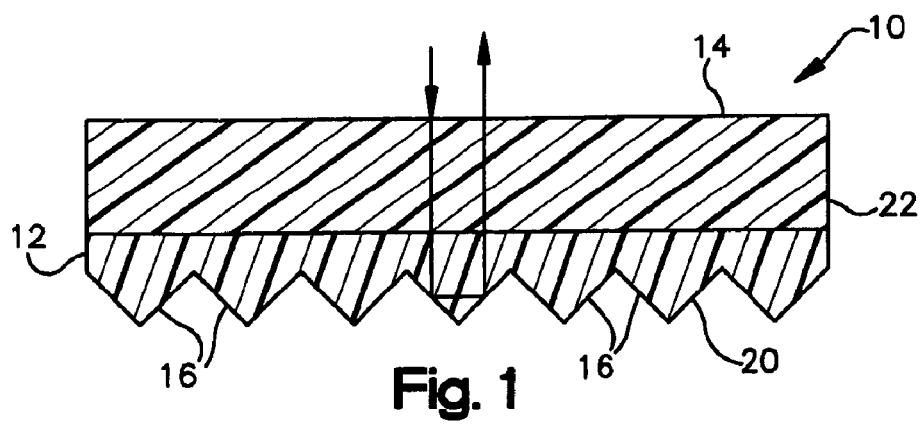
FIG. 1 is a cross-sectional view of a fluorescent sheeting having multiple colored film layers in accordance with an aspect of the invention.

As used herein, "CIE" refers to the Commission International de l'Eclairage (International Commission on Lighting) which is the responsible body for international recommendations for photometry and colorimetry. "CIE chromaticity diagram" or "x, y diagram" refers to a two-dimensional diagram in which points specified by chromaticity coordinates (x, y) represent the chromaticities of color stimuli in the CIE color matching system, as is known in the art. The "color" (or "chromaticity" or "chromaticity coordinates") of an article can thus be precisely measured or specified by a point or region (expressed in terms of one or more chromaticity coordinates (x,y)) on the CIE chromaticity diagram, using the CIE 1931 standard calorimetric system. This system uses a CIE Standard Illuminant D65 and a 0°/45° geometry (illumination along a direction coincident with the surface normal axis (0°) and detection along a direction 45° from the surface normal axis), thus simulating normal daytime illumination and observation conditions.

"Retroreflective" refers to a surface or article that returns a substantial portion of incident light back in the direction of the source of illumination over a wide range of incidence angles. The degree to which a surface is retroreflective is then referred to as its coefficient of retroreflection ("$R_A$") or simply as its retroreflectivity. Retroreflectivity is expressed in units of candelas per lux per square meter ($cd/(lux m^2)$), and unless otherwise noted is measured with a −4° entrance angle and a 0.2° observation angle.

The present invention relates to a fluorescent article, such as a fluorescent retroreflective sheeting, that includes multiple film (or sheeting) layers, which provide superior light stability and target fluorescent coloration parameters. Various embodiments of the invention are illustrated in the drawings. In each instance, an overlayer colored fluorescent film having a first coloration is combined with an underlayer colored fluorescent film having a second coloration different than the first coloration to provide a colored fluorescent sheeting or film with a target coloration and superior fluorescence color stability after prolonged outdoor exposure.

If retroreflective properties are desired, retroreflective elements commonly used in the retroreflective sheeting industry, such as microprismatic cube corner elements or glass microspheres, can be designed into the article. When a retroreflective fluorescent article is fabricated into, for example, a road sign, light from the headlights of oncoming vehicles enters the multilayered fluorescent article, through a front face thereof, the overlayer and underlayer colored fluorescent films, to the retroreflective elements, and is retroreflected back to the driver of the vehicle.

FIG. 1 illustrates a multiple layered fluorescent retroreflective sheeting 10 in accordance with an aspect of the invention. The fluorescent retroreflective sheeting 10 can be a fluorescent yellow retroreflective sheeting that is used in applications, such as signage, vehicle markings, roadway markings, and other applications where high visibility is desired. By fluorescent yellow, it is meant a color that is within the area defined by four sets of Commission Internationale de l'eclairage (CIE) chromaticity coordinates: (x=0.479, y=0.520), (x=0.446, y=0.483), (x=0.512, y=0.421), and (x=0.557, y=0.442). Any color having chromaticity coordinates falling within the area defined by these four sets of chromaticity coordinates is defined as "fluorescent yellow" in the CIE system.

The fluorescent retroreflective sheeting 10 includes an underlayer colored fluorescent film 12, an overlayer colored fluorescent film 14, and a plurality of retroreflective elements 16. By "overlayer" and "underlayer" it is meant the position of the films with respect to light incident the fluorescent retroreflective sheeting 10. The overlayer colored fluorescent film 14 is provided over the underlayer colored fluorescent film 12 so that light incident the fluorescent retroreflective sheeting 10 passes through the overlayer colored fluorescent film 14 before passing through the underlayer colored fluorescent film 12.

The retroreflective elements 16 can be incorporated into a surface 20 of the underlayer colored fluorescent film 12 that is opposite to and laterally displaced from a surface 22 of the underlayer colored fluorescent film 12 on which is disposed the overlayer colored fluorescent film 14. Examples of retroreflective elements 16 that be used include microprismatic cubes elements and spheres, such as described in U.S. Pat. No. 4,588,258 and U.S. Pat. No. 4,775,219, herein incorporated by reference in their entirety. These prismatic constructions can be manufactured in accordance with prismatic construction procedures disclosed in, for example, U.S. Pat. No. 3,810,804, U.S. Pat. No. 4,486,363, and U.S. Pat. No. 4,601,861, herein incorporated by reference in their entirety. It will be appreciated, any process and equipment can be used to incorporate the microprismatic retroreflective elements in or otherwise provide them on the underlayer colored fluorescent film 12.

The retroreflective feature provided by the retroreflective elements 16 is illustrated by the arrowed light pattern shown in FIG. 1. For simplicity of illustration, only two dimensions of this three-dimensional reflection are illustrated. This simplified light pattern shows an incident beam reflected twice by the fluorescent retroreflective sheeting 10 to provide a parallel reflected beam.

The underlayer colored fluorescent film 12 includes an underlayer polymer matrix and a first fluorescent colorant (e.g., pigment and/or dye) that is provided (e.g., dispersed or dissolved) in the underlayer polymer matrix. The overlayer colored fluorescent film 14 includes an overlayer polymer matrix and a second fluorescent colorant (e.g., pigment and/or dye) that is provided (e.g., dispersed or dissolved) in the overlayer polymer matrix. The first fluorescent colorant and the second fluorescent colorant provide fluorescent coloration, respectively, to the underlayer colored fluorescent film 12 and the overlayer colored fluorescent film 14.

The first fluorescent colorant and the second fluorescent colorant incorporated in, respectively, the underlayer polymer matrix and the overlayer polymer matrix are different to provide a multiple layer fluorescent sheeting (or film), which exhibits the fluorescent color needed for a particular application without having to physically place the fluorescent colorants in the same polymer matrix. With the respective fluorescent colorants within separate polymer matrices, any negative interaction which otherwise would be expected due to blending two fluorescent colorants (e.g., fluorescent dyes) together is eliminated. The combination of the overlayer colored fluorescent film 14 and the underlayer colored fluorescent film 12 according to the invention provides a superior light stable fluorescent sheeting article 10 with a fluorescent color, such as fluorescent yellow, that can be tailored to vary from fluorescent colors commonly available from fluorescent colorant (e.g., fluorescent dye) manufacturers, which each single film alone cannot achieve.

In accordance with an aspect of the invention, the underlayer colored fluorescent film 12 can have a fluorescent yellow-green coloration that is provided by a fluorescent yellow-green dye or a combination of fluorescent yellow, yellow-green and/or fluorescent green dyes that are dissolved in the underlayer polymer matrix. The fluorescent yellow-green dyes useful in the underlayer include perylene, thioxanthene, lactone, aminoketone, benzothiazine, benzoxanthene, Solvent 98 and Solvent Yellow 195. Dyes of the benzothiazine type, the benzoxanthene type, and the thioxanthene type have been found to be particularly suitable for inclusion within the underlayer component according to the present invention. Examples of such dyes are those available under the trade names "Huron Yellow" and "Lumofast Yellow" from DayGlo Color Corporation. Included are the benzothiazine dye "Huron Yellow D-417" and the benzoxanthene dye "Lumofast Yellow D-150." An example of a suitable thioxanthene dye is Napa Yellow D-195, also available from DayGlo. When included within the polymer matrix of an underlayer according to the invention, such dyes give excellent daytime luminance.

The fluorescent yellow-green dyes can be included in the underlayer polymer matrix in a range of about 0.01% to about 2.5% by weight, or in a range of about 0.05 to about 2.3% by weight, or in a range of about 0.2 to about 2.0% by weight, based upon the total weight of the matrix formulation. The weight loading of the fluorescent dye will depend upon the thickness of the underlayer colored fluorescent film 12 and the desired color intensity for a particular end use. For example, retroreflective articles generally require that this fluorescent dye should be of sufficient transparency such that the retroreflective function of the article is not significantly impaired.

The overlayer colored fluorescent film 14 can have a fluorescent orange coloration that is provided by at least one fluorescent orange dye or a combination of fluorescent red and/or fluorescent orange dyes that are dissolved in the overlayer polymer matrix. The fluorescent dye in the overlayer can include at least one perylene dye, such as a perylene imide dye. Exemplary perylene dyes are available from BASF (Rennselaer, N.Y.) under the "Lumogen" tradename. Examples include "Lumogen F Orange 240" and "Lumogen F Red 300".

The fluorescent orange and/or fluorescent red dyes can be included in the overlayer polymer matrix 14 in a range of about 0.005% to about 2.5% by weight, or in a range of about 0.007 to about 2.3% by weight, or in a range of about 0.01% to about 1.3% by weight, or in a range of about 0.05 to about 0.5% by weight, based upon the total weight of the matrix formulation. The weight loading of the fluorescent orange and/or fluorescent red dyes will depend upon the thickness of the overlayer fluorescent orange film 14 and the desired color intensity for a particular end use.

Advantageously, the fluorescent orange and/or combination of fluorescent orange and fluorescent red dyes used in the overlayer fluorescent orange film 14 can mitigate degradation (and/or fading) of the fluorescent yellow-green film 12. Fluorescent orange and/or combination of fluorescent orange and fluorescent red dyes used in the overlayer fluorescent orange film 14 are capable of at least partially blocking or absorbing visible light in a first wavelength range which can potentially cause degradation of the fluorescent yellow-green film while allowing transmission of an amount of visible light in a second wavelength range effective to make the fluorescent yellow-green dye fluoresce.

Figure 2:
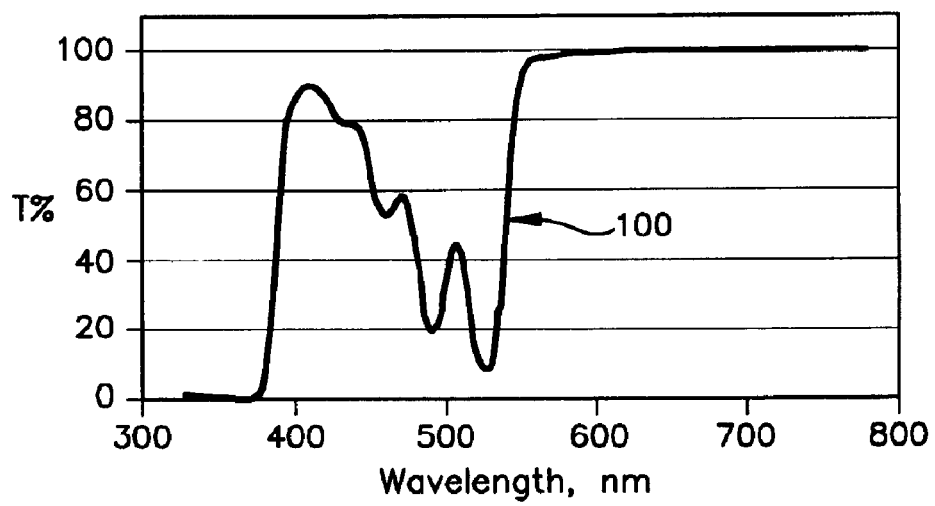
FIG. 2 is a plot of the light transmission as a function of wavelength for a fluorescent orange acrylic film.

For example, FIG. 2 is a plot 100 illustrating the light transmission of an exemplary fluorescent orange film that can be used as an overlayer fluorescent orange film 14 in accordance with an aspect of the present invention. The fluorescent orange film substantially absorbs (or blocks) visible light from a wavelength of about 450 nm to about 540 nm while allowing transmission of light with a wavelength greater than about 540 nm. This can mitigate degradation of an underlayer fluorescent yellow-green film that is susceptible to degradation by visible light in the 450 nm to about 540 nm range.

The combination of such fluorescent orange and/or fluorescent red dyes in the overlayer fluorescent orange film 14 and a fluorescent yellow-green dye in the underlayer fluorescent yellow film 12 results in coloration and chromaticity values, which fall well within industry standards for fluorescent yellow sheeting.

In an aspect of the invention, the overlayer polymer matrix includes one or more polymers and may be more weatherable as well as have a greater UV and/or visible light stability (or durability) than the underlayer polymer matrix. The overlayer polymer matrix includes an acrylic resin. The acrylic resin can readily incorporate one or more fluorescent orange and/or fluorescent red shade dyes (e.g., perylene imide fluorescent orange and/or fluorescent red dyes) and is very weatherable compared to other polymers (e.g., polycarbonate), which can be employed in fluorescent sheeting. An exemplary acrylic resin that responds to these objectives includes polymethyl methacrylate (PMMA). A particular acrylic resin is sold under the trade designation Plexiglas® DR-101 from Arkema.

The overlayer polymer matrix can include other polymers in addition to or besides an acrylic resin. These other polymers can include, for example, polycarbarbonates, polyesters, polystyrenes, styrene-acrylonitriles copolymers, polyurethanes, polyvinyl chlorides, polyarylates, such as disclosed in U.S. Pat. No. 6,514,594 (herein incorporated by reference in its entirety), and copolymers and combinations thereof. These other polymers when used in the overlayer polymer matrix can be formulated with an UV and/or visible light stabilizer that is effective to provide the overlayer polymer matrix with an enhanced UV and/or visible light stability.

The polymer matrix of the underlayer includes an acrylic resin. The acrylic resin can incorporate one or more yellow-green colorants. A particularly useful acrylic resin for the underlayer is sold under the trade designation Plexiglas® DR-101 from Arkema. The acrylic resin underlayer is especially preferred as the underlayer when microprism elements will be formed into the underlayer as illustrated in FIG. 1.

In an aspect of the invention, when a fluorescent yellow retroreflective sheeting is required for particular uses, such as for extremely visible highway or warning signs, the underlayer colored fluorescent film 12 can include an acrylic matrix and have a fluorescent yellow-green coloration that is provided by a fluorescent yellow-green dye. The overlayer colored fluorescent film 14 can include an acrylic matrix and have an orange coloration that is provided by a perylene imide fluorescent orange and/or fluorescent red dye. When assembled as a single article, a highly durable fluorescent yellow signage article with needed chromaticity can be provided.

Optionally, other generally known fluorescent film components can be included in either or both the overlayer polymer matrix and the underlayer polymer matrix. These other components can include, for example, UV absorbers and hindered amine light stabilizes (HALS). One or more of either or both can be included in any given polymer matrix. It is believed that the inclusion of the UV absorbers in the polymer matrices can retard degradation of the fluorescent colored article. Particularly, it is believed that benzotriazoles, benzophenones, and oxalanilides are UV absorbers, which may delay fading of the fluorescent colored article and enhance fluorescent durability.

Benzotriazole UV absorbers may be used within fluorescent colored polymeric matrix systems, particularly in the underlayer colored fluorescent film 12 of the present multiple layered articles. Examples of available benzotriazole UV light absorbers include 2-(2H-benzotriazol-2-yl)-4,6-bis-(1-methyl-1-phenylethyl)phenol, sold under the trade name "Tinuvin 234" by Ciba-Geigy, and 2-(4,6-diphenyl-1,3,5-triazine-2-yl)-5(hexyl)oxyphenol, sold commercially by Ciba-Geigy as "Tinuvin 1577".

Examples of commercially available benzophenone UV light absorbers include 2-hydroxy-4-n-octoxybenzophenone commercially available from Great Lakes Chemical Corporation under the trade name "Lowilite 22", 2,2-dihydroxy-4,4-dimethoxybenzophenone available under the trade name "Uvinul 3049" from BASF, and 2,2',2,4'-tetrahydroxybenzophenone available under the trade name "Uvinul 3050" from BASF. It has been found that these benzophenone types of UV absorbers are particularly useful for a fluorescent colored acrylic matrix. Individuals skilled in the art will recognize that many other UV light absorbers exist and may be suitable for use in the present invention.

In general, hindered amine light stabilizers (HALS) have been found to be useful to delay fading of fluorescent dyes. Oligomeric or polymeric HALS compounds having molecular weights of about 1500 and greater provide enhanced fluorescence durability. A combination of UV absorber and HALS compound generally helps to further prevent color fading and enhances color durability. Examples, of HALS compounds are oligomeric hindered amine compounds from Great Lakes Chemical under the trade name "Lowilite 62", or "Tinuvin 622" available from Ciba-Geigy.

HALS compounds can include, for example: dimethyl succinate polymer with 4-hydroxy-2,2,6,6-tetramethyl-1-piperidineethanol, commercially available from Ciba Specialty Additives as "Tinuvin 622"; poly[[6-[(1,1,3,3,-tetramethyl-butyl)amino]-s-triazine-2,4-diyl][[(2,2,6,6,-tetramethyl-4-piperidyl-)imino]hexamethylene[(2,2,6,6-tetramethyl-4-piperidyl)imino]] commercially available from Ciba Specialty Additives under the trade name Chimassorb 944; "Tinuvin 791" which is available from Ciba Specialty Additives and is a blend of poly[[6-1,3,3,-tetramethylbutyl)amino]-s-triazine-2,4-diyl][[(2,2,6,6,-tetramethyl-4-piperidyl)imino]hexamethylene[(2,2,6,6-tetramethyl-4-piperidyl)]imino]] and bis (2,2,6,6-tetramethyl-4-piperidynyl)sebacate; and "Hostavin N30" available from Clariant. Those skilled in the art will recognize that many other hindered amine light stabilizers exist and may be suitable for use in the present invention.

The polymer component of the overlayer polymer matrix and the underlayer polymer matrix makes up a substantial percent by weight of each polymer matrix. The polymer component ranges between about 90 and about 99.99 weight percent of the formulation making up each polymer matrix, for example, between about 95 and about 99 weight percent. When present, a UV absorber is provided at levels between about 0.1 and about 5 weight percent, for example, between about 0.3 and about 3 weight percent, based upon the total weight of the polymer matrix formulation. When a HALS component is present, it can be provided at between about 0.1 and about 2 weight percent, for example, between about 0.3 and about 1.5 weight percent, based upon the total weight of the formulation making up each polymer matrix.

The thickness of the overlayer colored fluorescent film 14 and the thickness of the underlayer colored fluorescent film 12 can vary somewhat depending upon the particular fluorescent article being prepared. Typically, the overlayer colored fluorescent film 14 can have a thickness of between about 2 mils and about 20 mils (0.05 mm to 0.5 mm), more typically between about 3 mils and about 10 mils (0.075 mm to 0.25 mm). A typical underlayer colored fluorescent film 12 will have a thickness of between about 2 mils and about 20 mils (0.05 mm to 0.5 mm), more typically between about 3 mils and about 10 mils (0.075 mm to 0.25 mm).

The fluorescent retroreflective sheeting 10 in accordance with the invention can be formed by laminating the underlayer colored fluorescent film 12 and overlayer colored fluorescent 14, such as by heat and/or pressure application using conventional equipment. Depending upon the particular use of the fluorescent retroreflective sheeting according to the invention, optional tie layers can be provided between the underlayer colored fluorescent film 12 and the overlayer colored fluorescent film 14. A laminating adhesive can also be included to the extent deemed necessary for a particular construction or end use needs. Any such tie layer or adhesive layers so included can be selected so as to not significantly detract from the properties to which the multiple layered fluorescent retroreflective sheeting article according to the invention is directed.

Optionally, a surface of one or more of the films 12 and 14 can be pre-printed with desired indicia so that a finished laminar or multiple-layered structure has the desired indicia on an inner surface, such as disclosed in U.S. Pat. No. 5,213,872 and U.S. Pat. No. 5,310,436, herein incorporated by reference in their entirety.

Figure 3:
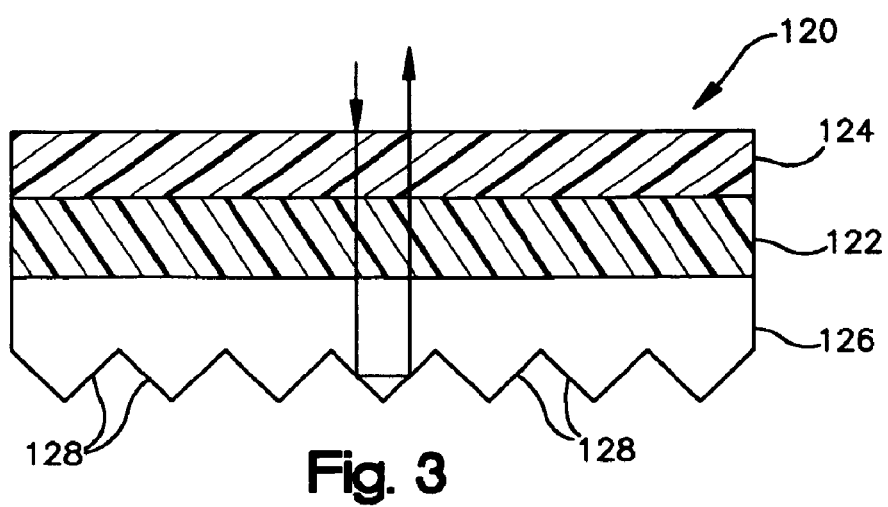
FIG. 3 is a cross-sectional view of a fluorescent sheeting having multiple colored film layers over clear microprismatic retroreflective elements in accordance with an aspect of the invention.

FIG. 3 illustrates a multiple layered fluorescent retroreflective sheeting 120 in accordance with another aspect of the invention. The multiple layered fluorescent retroreflective sheeting 120 in accordance with this aspect comprises an underlayer colored fluorescent film 122 and an overlayer colored fluorescent film 124, similar to the underlayer colored fluorescent film 12 and the overlayer colored fluorescent film 14 illustrated in FIG. 1, as well as a retroreflective layer 126 that includes a plurality of retroreflective elements 128. The retroreflective layer 126 can be made of a clear polymer that is suitable for embossing or forming, retroreflective elements 128, such as microprismatic corner cubes. With this arrangement, the multiple layers of fluorescent polymer, i.e., the underlayer colored fluorescent film 122 and the overlayer fluorescent colored film 124, do not include any retroreflective elements 128.

The retroreflective feature provided by the retroreflective elements 128 is illustrated by the arrowed light pattern shown. For simplicity of illustration, only two dimensions of this three-dimensional reflection are illustrated. This simplified light pattern show an incident beam reflected twice by the fluorescent retroreflective sheeting 120 to provide the parallel reflected beam.

Figure 4:
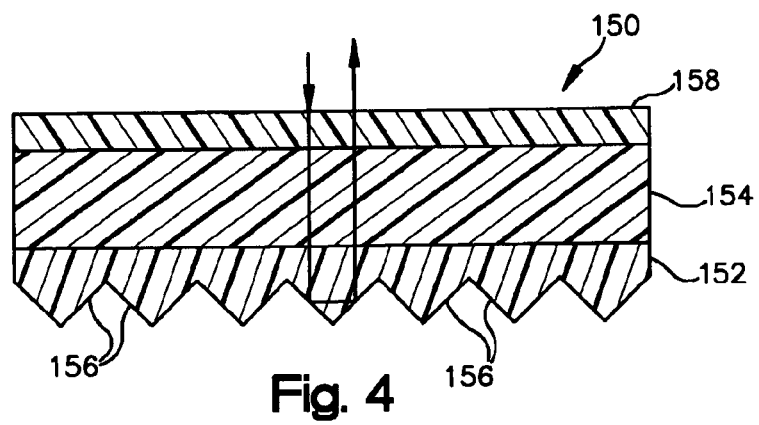
FIG. 4 is a cross-sectional view of a fluorescent sheeting having multiple film layers and including an external supplemental protective layer in accordance with an aspect of the invention.

FIG. 4 shows a fluorescent retroreflective sheeting 150 in accordance with another aspect of the invention similar to the fluorescent retroreflective sheeting 10. The fluorescent retroreflective sheeting 150 includes an underlayer colored fluorescent film 152, an overlayer colored fluorescent film 154, a plurality of retroreflective elements 156 and a cap or cover layer 158. The cap or cover layer 158 can potentially provide various functions or properties to the fluorescent retroreflective sheeting 150. These functions or properties can include, for example, providing UV screening to retard chalking and hazing of polymers used in the fluorescent retroreflective sheeting 150. UV screening can be provided by including an ultraviolet light absorbing compound or compounds into the cap or cover layer 158. Alternatively, UV screening can be provided by including a polymer in the cap or cover layer 158, which is itself an absorber of ultraviolet light. A polyarylate matrix is suitable in this regard as referenced hereinabove. The cap or cover layer 158 can also be used to enhance scratch resistance and graffiti protection. For example, the cap or cover layer 158, can comprise a hard coat silicone based polymer, such as is commercially available from GE Silicones, N.Y. Additionally, the cap or cover layer 158 may be selected to have other properties desirable for the front surface of a sign or the like, such as dew resistance and/or ease of printing. In one embodiment, the cap layer includes an acrylic resin that provides UV screening.

The cap or cover layer 158 thickness can range between about 1 mil and about 10 mils (0.025 mm to 0.25 mm). For example, the cap or cover layer thickness can range between about 2 mils and about 5 mils (0.05 mm to 0.125 mm), and particularly between about 2 mils and about 4 mils (about 0.05 mm to about 0.100 mm).

Figure 5:
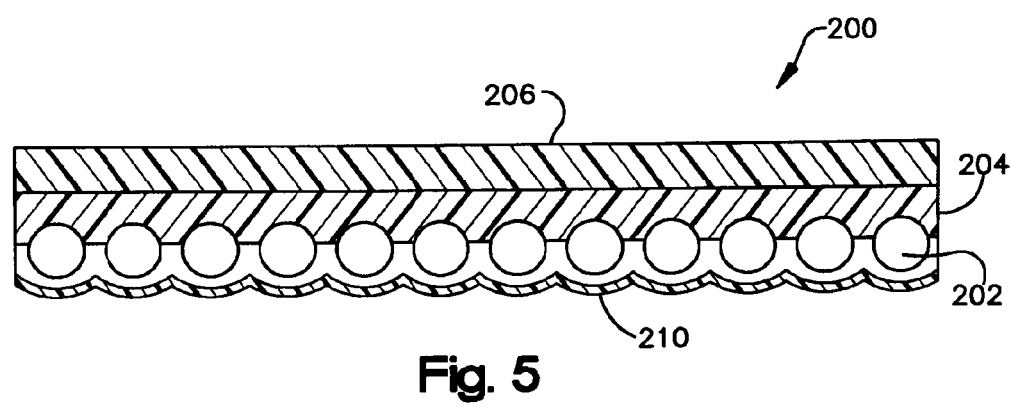
FIG. 5 is a cross-sectional view of an enclosed lens retroreflective sheeting material wherein the fluorescent sheeting having multiple film layers is disposed over an enclosed lens structure in accordance with an aspect of the invention.

FIG. 5 illustrates that a fluorescent retroreflective sheeting in accordance with the invention can be incorporated in an enclosed lens retroreflective sheeting article 200. Enclosed lens retroreflective sheeting is well known in the art. An early teaching in this regard is U.S. Pat. No. 2,407,680, herein incorporated by reference in its entirety, which discloses lenses, such as glass microspheres embedded in a sheeting structure with a flat, transparent cover film. In FIG. 5, glass microspheres 202 are embedded in an underlayer colored fluorescent film 204 that is provided below an overlayer colored fluorescent film 206. A specularly reflective layer 210 (e.g., vacuum deposited aluminum) can be provided in accordance with known art. The retroreflective nature of this enclosed lens structure is illustrated by the simplified two-dimensional arrowed light beam path which is shown to pass through the overlayer colored fluorescent film 206, the underlayer colored fluorescent film 204, into and through the microspheres 206, and back.

It is also possible to have the overlayer colored fluorescent film 206 and underlayer colored fluorescent film 204 laminated together and have an adhesive layer (not shown) which is transparent to join the microspheres 202 and the underlayer colored fluorescent film 204. In this instance, the microspheres 202 are embedded in the adhesive much as the underlayer colored fluorescent film 202 embeds the tops of the microspheres in FIG. 5.

Figure 6:
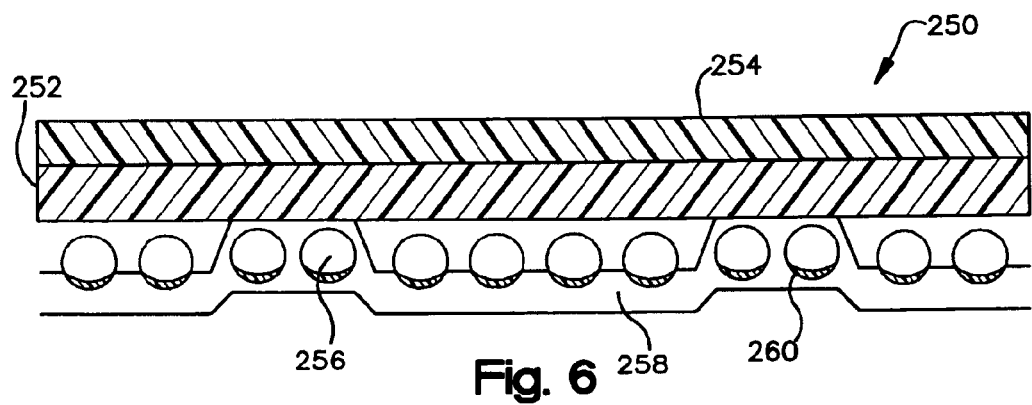
FIG. 6 is a cross-sectional view of an encapsulated lens retroreflective sheeting material wherein the fluorescent sheeting having multiple film layers is disposed over an encapsulated lens structure in accordance with an aspect of the invention.

FIG. 6 illustrates how a fluorescent retroreflective sheeting in accordance with an embodiment of the present invention can incorporated into an encapsulated lens retroreflective sheeting article. The fluorescent retroreflective sheeting article 250 includes an underlayer colored fluorescent film 252, an overlayer colored fluorescent film 254. A monolayer of lenses 256, such as glass microspheres, is at least partially embedded in a binder layer 258. The underlayer colored fluorescent film 252 is sealed to the binder layer to hermetically seal the lenses 256. The illustrated lenses 256 have their own reflective surfaces 260 to provide reflection according to the pattern indicated by the arrowed light path.

EXAMPLES

The following examples are provided for purposes of illustration and explanation. The films in these examples were made using a laboratory Killion single screw extruder with three heating zones or with the use of a Brabender mixer. In the single screw extruder set up, a mixture of the polymer resin, the indicated dye and optionally other additives was extruded into a film of about 2 to about 6 mils (about 0.05 mm to about 0.15 mm) thick. As an example, for the acrylic matrix film, the temperature zone settings were typically at 254° C., 238° C., and 226° C. The extrusion screw speed was about 27 rpm.

When the mixer was used, the equipment was a C.W. Brabender Plasti-Corder Prep-Mixer (manufactured by C.W. Brabender Instruments, Inc.). The material was compounded through melt mixing of polymer resins and other components and then converted into films of about 2 to about 6 mils (about 0.05 mm to about 0.15 mm) using a heated platen press. Mixing temperatures were in the range of between about 220° C. and about 270° C., and the mixing speed was 100 rpm for a mixing time of between about 3 and about 6 minutes. The thus prepared different films were laminated together at about 185° C. using a Hot Roll Laminator M from Cheminstruments.

The films of the examples were converted into retroreflective sheeting through the use of a known embossing technique to provide a structure as generally shown in FIG. 1. For this embossing process, a plurality of microprismatic corner cube elements were formed directly into the rear surface of the fluorescent film. Then, a finished retroreflective sheeting was made by bonding a white backing film to the embossed film in a repeating cellular pattern.

After preparing the samples, each was placed into a Xenon Arc accelerated weathering unit and color measurements were routinely measured. The test methodology used for the Xenon Arc weathering is outlined in ASTM G26-90, Section 1.3.1. Borosilicate inner and outer filters were used, and the irradiance level was set to 0.35 W/m$^2$ at 340 nm. Color measurements were taken on a Hunter Lab LS6000 instrument using a D65 light source, 2° observer, and a 0/45 geometric configuration. To determine the extent of fading and color shifts, the CIE ΔE* color difference factor was calculated to compare color measurements after accelerated weathering exposure with initial measurements made prior to weathering. A small value for the CIE ΔE * color difference factor indicates small differences in color. A value of about 2 or 3 is barely detectable to the human eye.

The luminance factor is a measure of the perceived brightness of an article under normal daytime illumination and observations conditions. This factor is expressed herein as the "Cap Y" for the article. The brightness (luminance factor) of each sample was measured using the standard D65 light source, 2° observer, and a 0/45 geometric configuration. Each sample had a backing film (such as a seal film) disposed behind the retroreflective elements.

Example 1

A fluorescent yellow sheeting having multiple film layers was prepared. The fluorescent yellow orange acrylic overlayer was prepared by blending an acrylate resin (Plexiglas® DR-101 from Arkema Inc.) with 0.13% by weight fluorescent orange perylene dye (Lumogen F Orange 240 from BASF). The thickness of the overlayer was in the range of 5 to 6 mils (1.25 mm to 1.5 mm). The fluorescent yellow-green acrylic underlayer was prepared by blending an acrylate resin (Plexiglas® DR-101 from Arkema Inc.) with 1.4% by weight fluorescent yellow-green thioxanthene dye (Napa Yellow D-195 from DayGlo). The thickness of the under layer was 3.5 mils (0.88 mm).

A UV screen layer (e.g., cap layer) was added over the overlayer of the fluorescent yellow sheeting. The screen layer was an acrylic 1 mil film available from Mitsubishi Rayon under the tradename HBS-005.

Example 2

A fluorescent yellow sheeting having multiple film layers was prepared. The fluorescent yellow orange acrylic overlayer was prepared by blending an acrylate resin (Plexiglas® DR-101 from Arkema Inc.) with 0.13% by weight fluorescent orange perylene dye (Lumogen F Orange 240 from BASF). The thickness of the overlayer was in the range of 5 to 6 mils (1.25 mm to 1.5 mm). The fluorescent yellow-green acrylic underlayer was prepared by blending an acrylate resin (Plexiglas® DR-101 from Arkema Inc.) with a blend of fluorescent yellow-green dyes: 0.2% by weight Lumofast Yellow D-150 (a benzoxanthene dye from DayGlo) and 1.2% by weight of Napa Yellow D-195 (a thioxanthene dye from DayGlo). The thickness of the under layer was 3.5 mils (0.88 mm).

A UV screen layer was added over the overlayer of the fluorescent yellow sheeting. The screen layer was an acrylic 1 mil film available from Mitsubishi Rayon under the tradename HBS-005.

Example 3

A fluorescent yellow sheeting having multiple film layers was prepared. The fluorescent yellow orange acrylic overlayer was prepared by blending an acrylate resin (Plexiglas® DR-101 from Arkema Inc.) with 0.13% by weight fluorescent orange perylene dye (Lumogen F Orange 240 from BASF). The thickness of the overlayer was in the range of 5 to 6 mils (1.25 mm to 1.5 mm). The fluorescent yellow-green acrylic underlayer was prepared by blending an acrylate resin (Plexiglas® DR-101 from Arkema Inc.) with a blend of fluorescent yellow-green dyes: 0.3% by weight Lumofast Yellow D-150 (a benzoxanthene dye from DayGlo) and 0.7% by weight of Napa Yellow D-195 (a thioxanthene dye from DayGlo). The thickness of the under layer was 3.5 mils (0.88 mm).

A UV screen layer was added over the overlayer of the fluorescent yellow sheeting. The screen layer was an acrylic 1 mil film available from Mitsubishi Rayon under the tradename HBS-005.

Example 4

A fluorescent yellow sheeting having multiple film layers was prepared. The fluorescent yellow orange acrylic overlayer was prepared by blending an acrylate resin (Plexiglas® DR-101 from Arkema Inc.) with 0.13% by weight fluorescent orange perylene dye (Lumogen F Orange 240 from BASF). The thickness of the overlayer was in the range of 5 to 6 mils (1.25 mm to 1.5 mm). The fluorescent yellow-green acrylic underlayer was prepared by blending an acrylate resin (Plexiglas® DR-101 from Arkema Inc.) with 1.4% by weight fluorescent yellow-green thioxanthene dye (Napa Yellow D-195 from DayGlo). The thickness of the under layer was 2.5 mils (1.0 mm).

The results of the accelerated weathering results for the retroreflective sheeting prepared from Examples 1-4 are reported in Table I. The weathering results show that the resultant fluorescent retroreflective sheeting has very good durability.

TABLE I

| | | $\Delta E^*$ and Cap Y of Samples Exposed to Accelerated Exposure Hours as Compared to Unexposed Samples | | | | | | | |
|---|---|---|---|---|---|---|---|---|---|
| | | 500 | | 1000 | | 1500 | | 2000 | |
| Example | Construction | Cap Y | $\Delta E^*$ | Cap Y | $\Delta E^*$ | Cap Y | $\Delta E^*$ | Cap Y | $\Delta E^*$ |
| 1 | FYG/FYO/UV screen | 65.11 | 3.6 | 67.15 | 8.17 | 68.95 | 10.47 | 70.44 | 13.31 |
| 2 | FYG/FYO/UV screen | 65.89 | 2.57 | 69.35 | 6.47 | 70.63 | 8.95 | | |
| 3 | FYG/FYO/UV screen | 67.77 | 3.23 | 71.6 | 6.44 | 73.73 | 10.15 | | |
| 4 | FYG/FYO | 71.72 | 4.8 | 72.96 | 8.7 | 75.75 | 15.2 | | |

Figure 7:
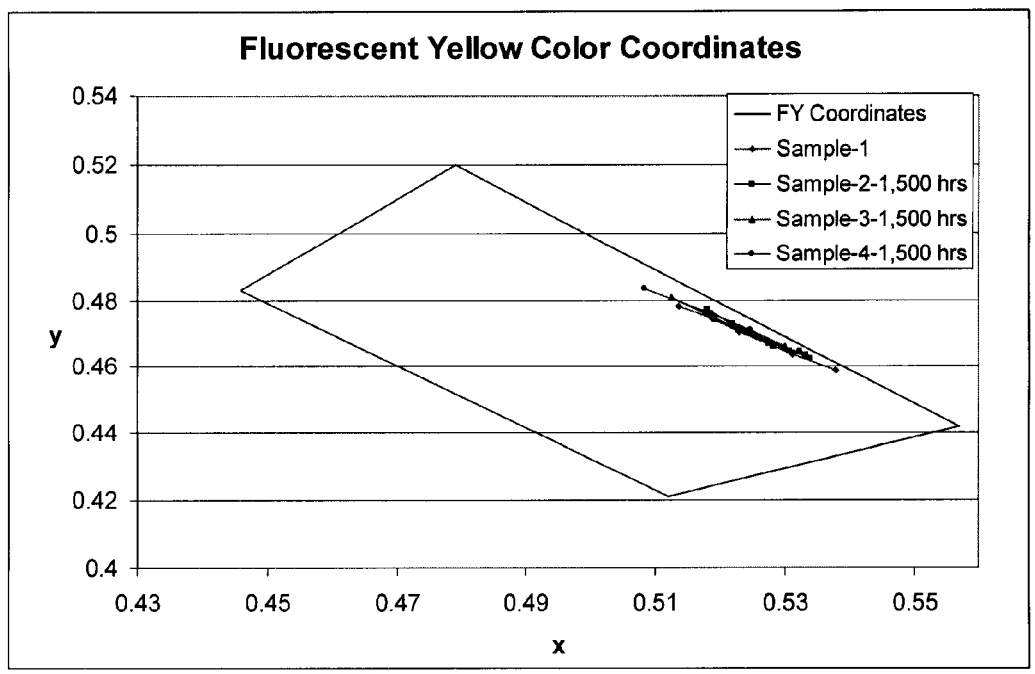
FIG. 7 is a plot of "x" and "y" color chromaticity values in terms of the CIE 1931 Standard Colorimetric System for film structures with respect to target fluorescent yellow values in accordance with an aspect of the invention.

The chromaticity of the retroreflective articles prepared from the films of Examples 1-4 are shown in FIG. 7. The multilayer articles have chromaticity coordinates falling within the area defined by these four sets of chromaticity coordinates defined as "fluorescent yellow" in the CIE system. The Cap Y of the multilayer articles, in one aspect of the invention, is greater than 50.

While the invention has been explained in relation to its preferred embodiments, it is to be understood that various modifications thereof will become apparent to those skilled in the art upon reading the specification. Therefore, it is to be under stood that the invention disclosed herein is intended to cover such modifications as fall within the scope of the appended claims.

What is claimed is:
1. A fluorescent yellow article comprising:
   an underlayer fluorescent yellow-green film that includes a first fluorescent colorant in an underlayer acrylic matrix; and
   an overlayer fluorescent orange film provided over the underlayer film, the overlayer film including a second fluorescent colorant in an overlayer acrylic matrix;
   the first fluorescent colorant having a first chemistry and the second colorant having a second colorant different from the first chemistry.

2. The fluorescent yellow article of claim 1 wherein the first colorant comprises a yellow-green shade fluorescent dye.

3. The fluorescent yellow article of claim 2 wherein the first fluorescent colorant comprises at least one dye chosen from benzothiazine, thioxanthene and benzoxanthene.

4. The fluorescent yellow article of claim 1 wherein the second colorant comprises at least one red-shade fluorescent dye or orange-shade fluorescent dye.

5. The fluorescent yellow article of claim 4 wherein the second colorant comprises a fluorescent perylene dye.

6. The fluorescent yellow article of claim 1 further including a cap layer polymeric film overlying the overlayer fluorescent orange film.

7. The fluorescent yellow article of claim 1 having chromaticity coordinates (x,y) within the area defined by (x=0.479, y=0.520), (x=0.446, y=0.483), (x=0.512, y=0.421), and (x=0.557, y=0.442).

8. A fluorescent yellow retroreflective article comprising:
an underlayer fluorescent yellow-green film that includes a first fluorescent colorant in an underlayer acrylic matrix;
an overlayer fluorescent orange film provided over the underlayer film, the overlayer film including a second fluorescent colorant in an overlayer acrylic matrix, wherein the first fluorescent colorant has a first chemistry and the second colorant has a second colorant different from the first chemistry; and
retroreflective elements.

9. The fluorescent yellow retroreflective article of claim 8 wherein the first colorant comprises a yellow-green shade fluorescent dye.

10. The fluorescent yellow retroreflective article of claim 9 wherein the first fluorescent colorant comprises at least one dye chosen from benzothiazine, thioxanthene and benzoxanthene.

11. The fluorescent yellow retroreflective article of claim 8 wherein the second colorant comprises at least one red-shade fluorescent dye or orange-shade fluorescent dye.

12. The fluorescent yellow retroreflective article of claim 11 wherein the second colorant comprises a fluorescent perylene dye.

13. The fluorescent yellow retroreflective article of claim 8, wherein the retroreflective elements are formed in the underlayer.

14. The fluorescent yellow retroreflective article of claim 13 wherein the retroreflective elements are microprismatic elements.

15. The fluorescent yellow retroreflective article of claim 13 wherein the retroreflective elements are arranged to provide an encapsulated lens retroreflective construction.

16. The fluorescent yellow retroreflective article of claim 13 wherein the retroreflective elements are arranged to provide an enclosed lens construction.

17. The fluorescent yellow retroreflective article of claim 8 having chromaticity coordinates (x,y) within the area defined by (x=0.479, y=0.520), (x=0.446, y=0.483), (x=0.512, y=0.421), and (x=0.557, y=0.442).

* * * * *